United States Patent [19]

Paananen et al.

[11] 3,764,087

[45] Oct. 9, 1973

[54] MAGNETIC TAPE DRIVE

[75] Inventors: Eugene E. Paananen, Thousand Oaks; Ladislao C. Csengery, Los Angeles; Richard J. Barry, Ventura, all of Calif.

[73] Assignee: Burroughs Corporation, Detroit, Mich.

[22] Filed: June 11, 1971

[21] Appl. No.: 152,290

Related U.S. Application Data

[63] Continuation-in-part of Ser. No. 53,404, June 9, 1970, abandoned.

[52] U.S. Cl. .................... 242/186, 242/191, 318/6, 318/327

[51] Int. Cl. . B65h 25/10, B65h 25/28, G11b 15/46

[58] Field of Search ................ 242/186, 188, 75.51, 242/191; 318/313, 326, 327, 331, 6; 250/219 R, 219 WD, 231 R

[56] References Cited

UNITED STATES PATENTS

| | | | |
|---|---|---|---|
| 3,109,604 | 11/1963 | Brenner | 242/186 |
| 3,297,266 | 1/1967 | Rumple | 242/186 |
| 3,348,107 | 10/1967 | Hamby | 242/75.51 X |
| 3,411,055 | 11/1968 | Carter et al. | 242/75.51 X |
| 3,454,960 | 7/1969 | Lohrenz | 242/184 |
| 3,543,115 | 11/1970 | Grygera | 318/327 X |
| 3,548,270 | 12/1970 | Silva | 318/6 |

*Primary Examiner*—George F. Mautz
*Assistant Examiner*—John M. Jillions
*Attorney*—Christie, Parker & Hale

[57] ABSTRACT

Apparatus is disclosed for maintaining, at a constant preselected value, the velocity at which a magnetic tape moves from a supply reel, past an electromagnetic read or write head, and onto a take-up reel during motorized rotation of one of the reels. A motor rotates one of the reels. A motor control applies a motor control signal to the motor and comprises apparatus for causing the motor control signal to have a non-linear component which is inversely proportional to the diameter of the tape on one of the reels. The non-linear signal component causes the motor to rotate the reel at a velocity inversely proportional to increasing tape diameter and thereby maintain a substantially constant linear velocity of tape.

Preferably, the apparatus for causing the non-linear signal component comprises a sensing apparatus providing a series of signals, the accumulated number of which is indicative of the number of revolutions of one of the reels as tape passes between reels. A counter counts the series of signals and forms a representative digital output signal. A digital to analog converter converts the digital signal to an analog signal. A circuit is connected to the converter which modifies the analog signal and forms the above-defined non-linear signal component. Also, preferably apparatus is provided for causing another signal component in the motor control signal which is inversely proportional to angular velocity of the driven reel so as to maintain the angular velocity of the reel constant for a given value of non-linear signal.

4 Claims, 10 Drawing Figures

INVENTORS:
EUGENE ELMER PAANANEN,
LADISLAO CHUMEY CSENGERY,
RICHARD JOSEPH BARRY

Patented Oct. 9, 1973

3,764,087

5 Sheets-Sheet 5

MAGNETIC TAPE DRIVE

CROSS-REFERENCE TO RELATED APPLICATIONS

This application is a continuation-in-part of copending application Ser. No. 53,404 filed June 9, 1970, now abandoned.

BACKGROUND OF THE INVENTION

1. Field of the Invention

This invention relates to magnetic tape recording systems. More specifically, the invention relates to a method and apparatus, in such a system, driving tape at a constant linear velocity.

2. Description of the Prior Art

A common form of tape drive today is known as a reel tape drive. In such a drive, the take-up reel, for example, of a recording system is rotated at a constant angular velocity. Since the tape stack size or diameter of tape on the take-up reel is variable, the linear velocity at which tape is transferred from a supply reel onto the take-up reel also varies.

Tape velocity may not pose a problem in some applications. In some contexts, however, such as in a digital data storage system, the use of tape as the storage medium requires that bits of data be recorded thereon with as great a bit density along the length of tape as possible. Since the recording density and read back signal varies as a function of the linear tape velocity, i.e., the recording density and read back signal decrease as linear tape velocity increases, it is undesirable to use a normal take-up reel drive. The fidelity of reproduction is also dependent on a minimum speed differential between the recording and reproducing speed. A constant tape velocity is, therefore, necessary.

In the past, linear tape velocity has been maintained constant by three main methods. First, by a capstan/-pinch roller-type mechanism used to drive the tape at a constant linear velocity. If the tape is being driven at a rate faster than the take-up rate of the take-up reel, apparatus is employed to speed up the reel. Correspondingly, if the tape is being driven slower than the take-up reel, the reel is slowed down.

The capstan/pinch roller method is the one most often employed since it provides accurate control of linear tape velocity at a relatively minimal cost. Such method, however, is disadvantageous when sought to be used with a tape cassette or tape cartridge insertion mechanism. Some of the major disadvantages in such a mechanism are as follows:

1. The cassette insertion mechanism is considerably more complex because the capstan drive roller must be positioned through a hole in the cassette and the drive applied to the backside of the tape. Furthermore, the read head and pinch roller must be mounted on a movable assembly and retracted out of the way when positioning the capstan.

2. Compliant or edge guiding is not as effective in a capstan/pinch roller type cassette drive because the tape generally used does not have the required rigidity. The guiding accuracy is determined almost entirely by the tracking accuracy of the capstan drive. Additionally, the required accuracy is difficult to maintain over a period of time as the parts wear.

3. The possibility of tape damage is much greater because the tape has a tendency to wrap around the capstan under certain environmental and tape conditions.

4. Controlled backspacing or backward read capabilities are difficult to implement. The complexity of the guiding and spooling mechanism increases considerably if a single capstan/pinch roller is used for forward and backward driving.

The second method for maintaining constant linear tape velocity makes use of the reel drive mechanism, but provides a prerecorded clock track on the tape. Clock pulses read from the clock track indicate the linear velocity of tape. If the tape velocity is too high, as indicated by more pulses being read in a preset time interval, a servo control system is used to slow down the angular velocity of the motor driving the take-up reel. This method, although efficient, has the obvious disadvantage of wasted tape, cost and inconvenience because of the required clock track.

A third method for maintaining constant tape velocity is also used with the take-up reel drive approach. Constant linear tape velocity is provided by driving a tachometer with the tape. The tachometer signal indicates when the desired linear tape velocity has been reached and controls the rotational velocity of the take-up reel. Although this method eliminates the need for a clock track, there are disadvantages similar to those listed for the pinch roller/capstan method. In addition, there is slippage between the tape and the tachometer apparatus; hence tape velocity is not accurately sensed.

Because of the numerous disadvantages of the capstan/pinch roller method when used in a cassette type drive mechanism, it is desirable to use a form of take-up reel drive. Such a reel drive would enable any type of recording system, cassette or otherwise, to be used therewith. However, the disadvantage of prerecorded clock tracks and tape driven tachometers for controlling the linear tape velocity in cassette-type systems make such methods undesirable.

Apparatus is employed in the textile industry for automatically reducing the speed of rotation of a D.C. motor driven mandrel in correspondence with the increased diameter of a roll of material wound on a core carried by the mandrel. To this end, a switching device and electrical circuits produce electrical pulses during rotation of the mandrel. A stepping motor steps through a sequence of steps responsive to the electrical pulses and, in doing so, rotates a potentiometer through a speed reducer. The potentiometer is connected in series with the armature of the D.C. motor and controls its speed. Such an arrangement is acceptable for textile applications where the purpose is only to reduce slippage between layers of material wound on the core. However, such an arrangement does not control the motor so as to maintain a constant linear velocity of the material.

SUMMARY OF THE INVENTION

The present invention substantially eliminates the above listed disadvantages in a reel drive mechanism and maintains a constant linear tape velocity past a read or write head by including controllable means for driving one of the reels. Control means provide to the controllable means a control signal comprising a nonlinear signal which is inversely proportional to the diameter of tape wound on the driven reel and inversely proportional to the required angular velocity of the driven reel to maintain a substantially constant linear tape velocity. The controllable means responds to the non-linear signal for driving the reel at an angular velocity substantially directly proportional to the non-linear signal.

With such an arrangement, the need for the prior art tape driven tachometer or prerecorded sync pulses are eliminated and angular velocity of the reel is modified to effect a substantially constant linear tape velocity.

In a preferred embodiment, the control means comprises means for providing a series of signals indicative of the number of revolutions of one of the reels and a counter for counting the signals to produce a corresponding digital signal. A digital to analog converter converts the digital signal to an analog signal. A circuit is connected to the digital to analog signal to modify the analog signal and thereby form the non-linear signal. As a result, a very simple, inexpensive, and accurate circuit is provided that forms an electrical signal that can be used by conventional electrical control circuits for motors.

The control means of another preferred form of the invention comprises means for providing in the control signal a signal component which is inversely proportional to the angular velocity of the driven reel and thereby maintain a constant angular velocity of the reel for a given value of non-linear signal.

In the presently preferred embodiment, the back emf of the motor is used to provide the signal indicative of the angular velocity of the reel. It should be noted, however, that a tachometer sensing the motor speed as, for example, an optical or magnetic pick-up from the motor shaft or driven gear, can also be used to provide such reel angular velocity signal indication.

In another illustrated embodiment, an optical system is provided which directly senses tape diameter on a reel and forms the signal representing diameter of the tape.

The counter approach is preferred for cassettes of tape or other applications where dimensions of the hub and tape thickness can be controlled to a reasonable degree. The effect of these errors in the counter approach is negligible where tape is exchanged between similar tape drive devices. The counter approach is also preferred because it does not have the inherent instability of optical systems. Additionally, the optical approach requires a window in a tape cartridge or an open reel to sense tape diameter whereas this is not required in the counter approach. However, the optical approach has the advantage over the counter approach in that it is insensitive to hub or tape thickness (i.e., dimensional) errors.

BRIEF DESCRIPTION OF THE DRAWING

These and other aspects and advantages of the present invention are more clearly defined and described with reference to the drawings in which.

DESCRIPTION

Figure 1:
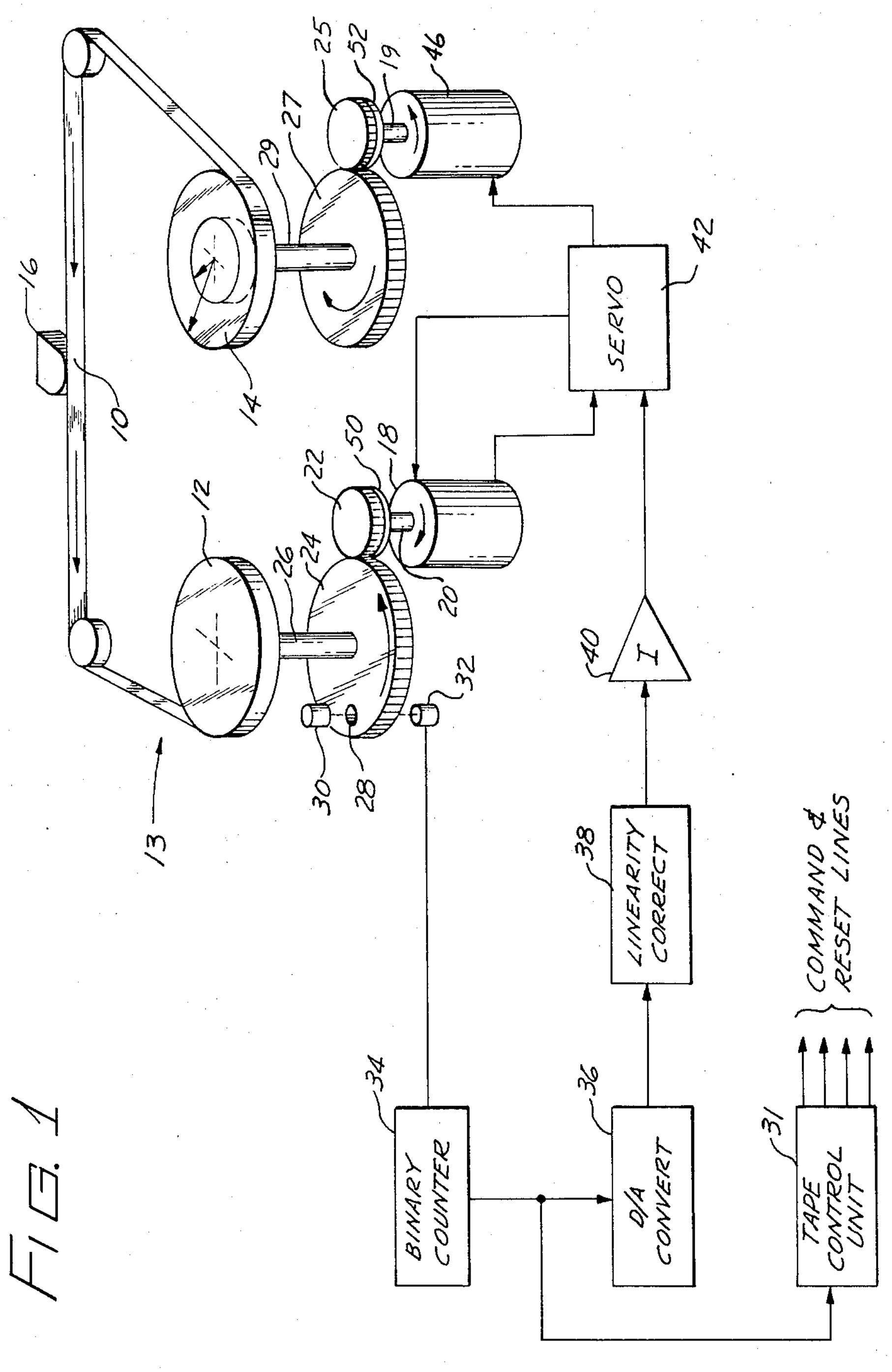
FIG. 1 is a general schematic diagram, partial in perspective and partial in block diagram, illustrating a preferred embodiment of the present invention utilizing a counter.

A preferred embodiment of the present invention is shown in FIG. 1 where magnetic tape 10 is driven between a take-up reel 12 and a supply reel 14 and past an electromagnetic read and write head 16. The reels 12 and 14 and the tape are actually part of a conventional tape cassette indicated generally by the numeral 13. However, the invention is not limited thereto. A forward drive motor 18 is used to drive the take-up reel 12 through a drive chain including a motor drive shaft 20, a clutch 50, a motor drive wheel or gear 22, a follower wheel or gear 24, and a drive shaft 26. Similarly, a reverse drive motor 46 is used to drive the supply reel 14 through a drive chain including a motor drive shaft 19, a clutch 52, a gear 25, a follower gear 27 and a drive shaft 29.

Clutches 50 and 52 are electro-mechanical clutches well known in the art which are individually actuated. When the cassette is introduced into the system motors 18 and 46 continuously rotate shafts 19 and 20 in opposite directions as indicated. Clutches 50 and 52 are used to respectively disconnect the rotating shafts 19 and 20 from gears 22 and 25 and hence from reels 12 and 14. Clutch 50 alone is actuated causing it to connect shaft 20 to gear 24 and hence to reel 12 in order to drive take-up reel 12 and wind tape thereon. Similarly, clutch 52 alone is actuated causing it to connect shaft 19 to gear 25 and hence to reel 14 in order to drive supply reel 14 so that tape is wound thereon. It should be noted that follower gear 24 is connected to and rotates with take-up reel 12 regardless of whether motor 18 drives tape onto the take-up reel 12 or whether motor 46 drives tape onto supply reel 14. In the preferred embodiment, there is a 1:1 ratio of rotation between reel 12 and follower gear 24.

To be explained in detail with respect to FIG. 1, motor 18 forms a controllable means which is responsive to applied control signals for driving the reel 12. Control means applies a control signal to the motor which has a non-linear signal component which is inversely proportional to the diameter of tape wound on the take-up reel 12. As a result, the motor maintains a substantially constant linear velocity of tape. The control means is hereinafter described with respect to the remainder of FIG. 1.

A circular aperture 28 is defined through take-up reel follower 24. A light source 30 is located proximate to the upper surface of follower 24 and at the same radius from the center of the follower as aperture 28. Follower 24 acts as a mask prohibiting light from passing to the underside thereof except when the light source 30 is aligned with aperture 28 as is shown in FIG. 1. A photo detection means 32, such as a photoelectric cell is aligned with the light source and is positioned proximate the lower surface of follower 24. Cell 32 emits an electrical signal each time light strikes it from light source 30, i.e., each time follower 24, and thus take-up reel 12, rotates 360° about their common axes.

The signals generated by photoelectric cell 32 are counted by a binary counter 34. Although the invention is not limited thereto, in the preferred embodiment shown herein, the counter increases one count for each revolution of the reel and hence once for each additional wind of tape on the reel 12. In this manner, the state of the counter 34 always directly represents the total number of layers of tape wound on the reel 12. An increase in count of the counter 34 means that the radius of tape wound on the take-up reel also increases. Thus, for a given angular velocity of the reels due to the drive of either motor 18 or 46, the tape velocity between reels will increase unless angular velocity of the motor is decreased an appropriate amount. The invention eliminates this increase in tape velocity using a non-linear signal directly proportional to tape diameter.

The binary counter 34 forms digital signals corresponding to the count and a digital to analog converter 36 converts the digital signals to an analog signal which directly represents the number of layers of tape wound on the reel 12. The signal produced by converter 36 is essentially linear except for minor step functions created by each change in state of the counter 34.

The counter 34 counts each winding on the reel. Thus, the counter, in the disclosed embodiment, must have a sufficient count to count the total number of revolutions of the reel 12 to completely wind up the tape. However, other counts might be used within the scope of the invention, for example, greater than or less than one count per revolution of the reel, depending on the desired accuracy.

The required motor angular velocity in radians per second to maintain constant linear tape velocity when plotted as a function of the pulse count is a segment of a hyperbolic curve and is inversely proportional to tape diameter. The motors are D.C. motors and the angular velocity produced by the motors are a direct function of the applied armature current. Also, the angular velocity of reel 12 is directly proportional to angular velocity of the motor 18 and hence armature current.

However, the diameter of tape builds up on reel 12 as a non-linear function with each revolution of the reel. As a result, a non-linear armature current proportional to diameter of tape is required to maintain linear velocity of tape constant.

Figure 3A:
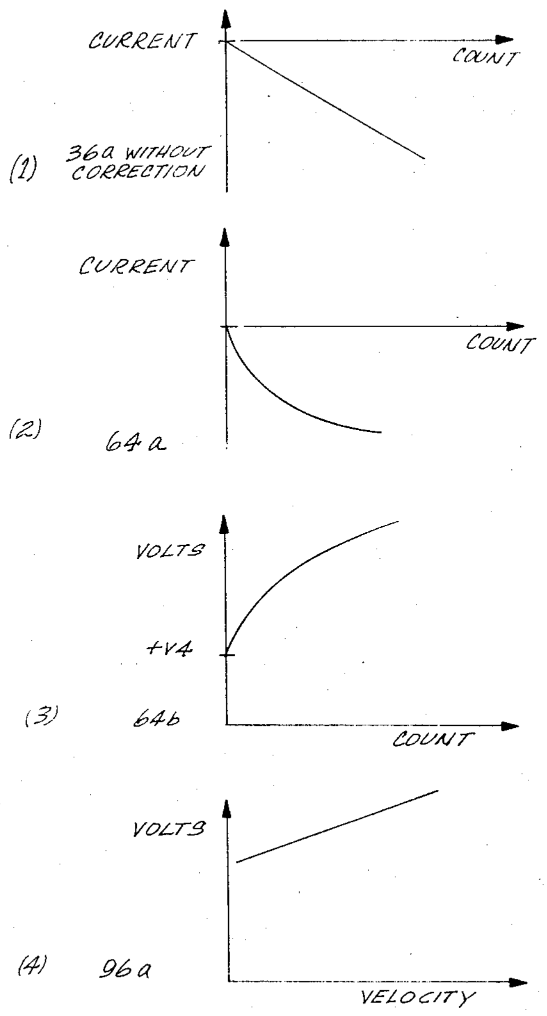
FIG. 3A is a signal diagram showing the waveform of signals at the indicated points in the circuit of FIG. 2.
Figure 3:
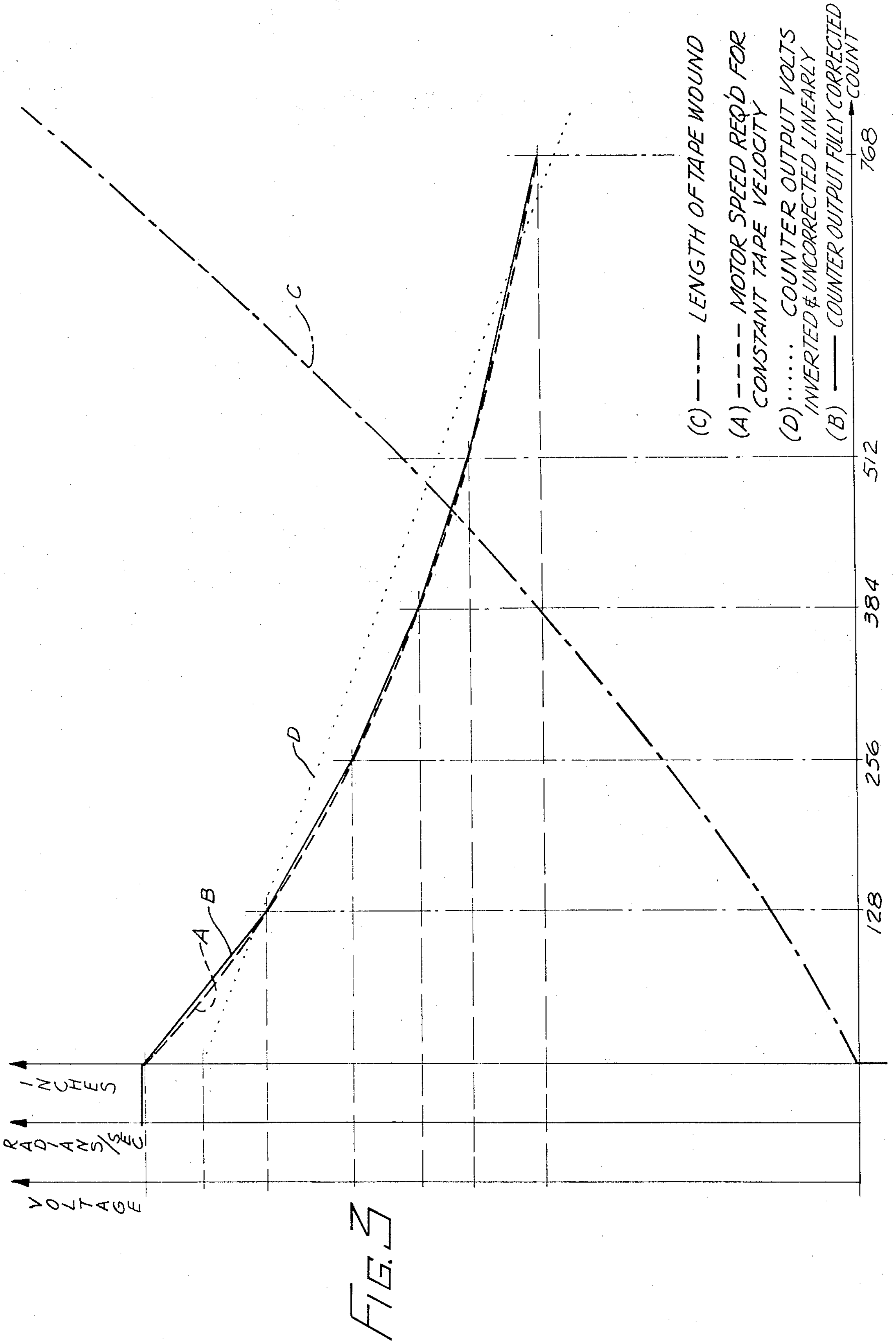
FIG. 3 is a series of graphical representations of the variable parameters of the system as incorporating the preferred embodiment of FIGS. 1 and 2.

FIG. 3 contains a number of graphs illustrating the required relationship between length of tape wound on the reel (plot C), motor speed (or angular velocity) (plot A), counter output after being converted by the digital to analog converter (plot D) and corrected counter output (plot B), to maintain constant linear velocity of tape.

A signal as represented by curve B, plotted against voltage and counts of counter 34, is required to maintain constant linear tape velocity. It will now be seen that the linearly increasing output of the counter 34 converted to an analog signal by converter 36 (represented by plot D), must be modified or converted to a non-linear signal proportional to tape diameter (as represented by plot B) in order to maintain constant linear tape velocity.

To this end, the signal produced by D/A converter 36 is modified by a linearity correcting circuit 38 which makes the signal non-linear in a manner more fully explained with regard to FIG. 2 below. The non-linear signal increases with increasing count. The non-linear signal is then fed from circuit 38 to an inverter 40 which provides an output signal that decreases as the pulse count increases. The output from inverter 40 accurately represents the motor speed required to maintain linear tape velocity constant.

A non-linear signal increasing with increase in tape diameter together with an inverter to invert the signal is shown in FIG. 1 for purposes of explanation to emphasize that the armature current and angular velocity of the motor and reel must decrease as tape diameter increases to achieve constant linear tape velocity. It will be seen that the proper decreasing of angular velocity of the motor and the reel with increase in tape diameter could be achieved by forming the right signal to begin with or by proper selection of the servo.

The signal from inverter 40 is used as a reference signal for a servo control unit 42, which additionally receives a signal from motor 18. This latter signal is produced by the back emf in the armature circuit of the motor and represents the motor angular velocity.

Generally speaking, servo 42 compares the reference signal from inverter 40, representing the required motor speed, and the signal induced by the motor back emf (representing motor speed). If the signal from inverter 40 is negative with respect to the signal induced by the back emf, it means that the motor shaft 20 is revolving, and the take-up reel 12 is rotating too fast and must be slowed. Motor 18 is current controlled and thus will decrease its speed as less current is supplied thereto. Servo 42 controls the current supplied to the motor 18 and thus the rotational velocity of motor 18 and of take-up reel 12. Therefore, in response to the detection at its inputs of such a positive difference between the two signals, servo 42 supplies a decreasing current to motor 18 from its output thereby slowing the motor and thus the rotation of the take-up reel. This is continued until the difference is eliminated.

The counter 34 represents the number of layers of tape wound on the take-up reel 12. Therefore its state can be simultaneously used for other purposes than for control of the tape velocity. To this end, the counter is shown connected to the input of a tape control unit 31, which provides forward, reverse, fast forward, rewind and counter reset signals to the tape transport of FIG. 1. Thus, the counter state can be used as an address for the tape to establish tape location relative to the read/-write head 16. Thus control unit 31 can use the counter state to determine when read or write is to be commenced or ended. The counter state can also be used to locate approximate tape position without need to read the tape during a fast reverse mode. Also, it is advantageous to rewind tape at a high speed until the beginning of tape is almost reached and then switch to a lower speed. The counter state can be used to determine when the beginning of tape is approaching. Thus, the control unit 31 may sense the state of the counter for any of these purposes.

Figure 2:
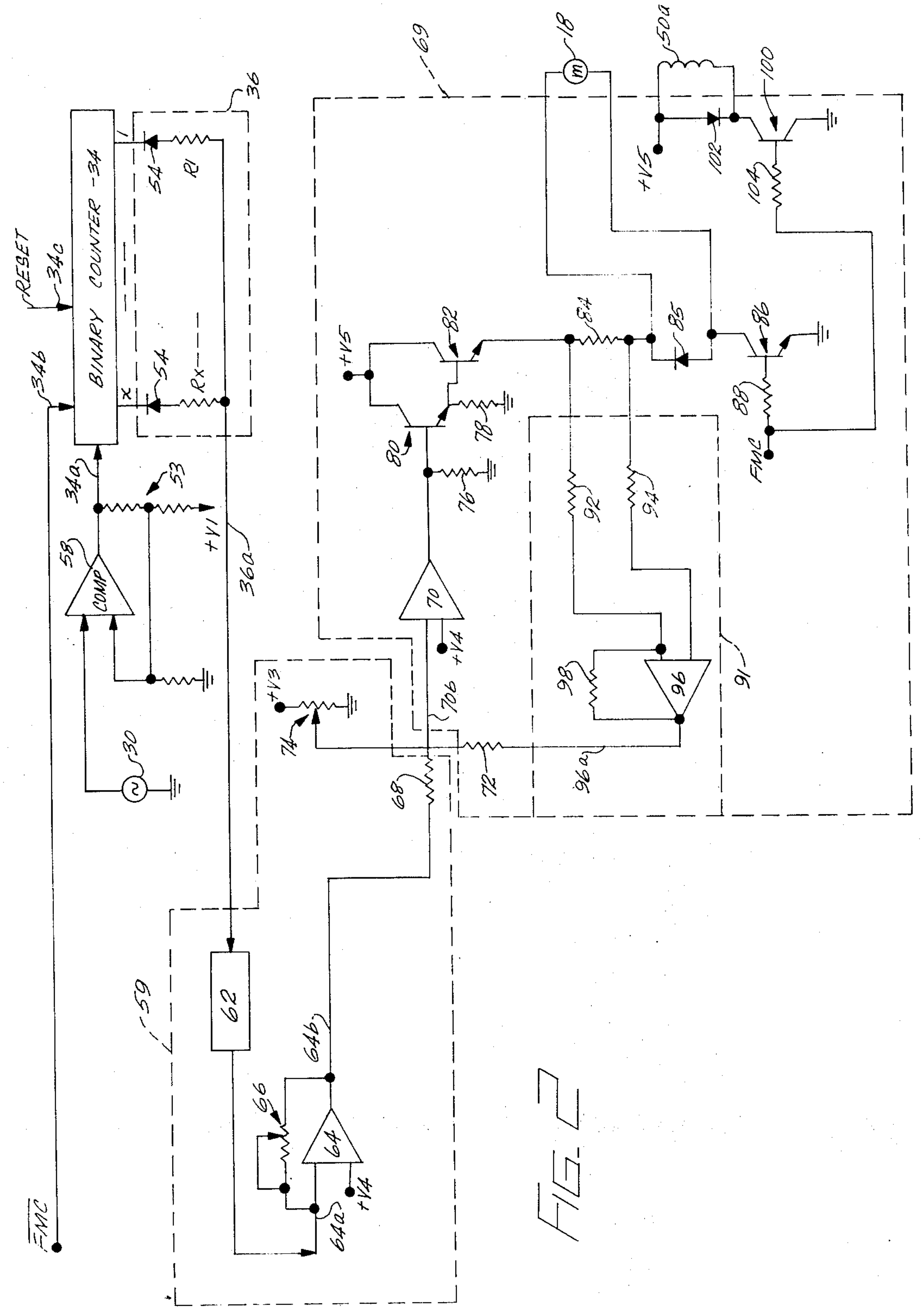
FIG. 2 is a detailed schematic diagram of one embodiment of the invention as illustrated by the general schematic diagram of FIG. 1.

FIG. 2 is a detailed schematic diagram of an alternate and preferred form of the control means which is exemplified in FIG. 1 and embodies the present invention.

As described above, electrical signals are generated by photoelectric cell 32 each time take-up reel 12 makes one revolution. Cell 32 is coupled between ground and an input to a comparator 58. Resistors 53 are connected as shown between the input and output of comparator 58 and to ground and a +V1 source of potential. The resistors 53 provide a hysteresis in the circuit to prevent multiple counting signals from being formed by comparator 58 when the reel stops with the hole 28 in follower 24 aligned with the photocell 32.

The comparator 58 is constructed so that it normally does not produce an output signal and only produces one when the signal from cell 32 is equal to or exceeds the signal from resistors 53. When the signal from photocell 32 rises (due to illumination from light 30) to the point where it is equal to or exceeds the signal provided by resistors 53, the comparator decreases its output signal. This decrease in output signal lowers the bias back to its input via resistors 53. Hence, it now takes a lower voltage from cell 32 to terminate the signal from comparator 58. In this manner, minor fluctuation in illumination does not affect the output signal from comparator 58.

The output of comparator 58 is coupled to counter 34. The counter is a conventional straight binary counter which forms binary coded output signals at outputs 1 through *x*. Only outputs 1 and *x* are shown and *x* represents the maximum number of outputs required to indicate the full binary count of counter 34. The 1 output is the least significant and *x* the most significant output of the counter 34. Each output is either a high potential or a low potential (of about 0 volts) for each state of the counter. The counter forms a high potential signal at each output 1 through *x* when in an initial or 0 state and forms combinations of high and low potential output signals as the counter is counted up from its initial state. Each time a drop in signal is emitted by comparator 58 (upon sensing a signal from 30 equal to or in excess of the bias signal provided by resistors 53), the leading edge of the drop in signal is sensed by counter 34 which counts one state up or down.

The direction of count of counter 34 is controlled by a signal on up/down control line **34*b*. The up/down control line 34*b* is connected to a control line FMC which receives a control signal from a tape control (not shown). FMC (shown in FIG. 2) stands for "forward motor control" and FMC is the logical inverse of FMC and stands for "reverse motor control." The absence of a control signal on line 34*b* means a forward drive for reel 12 and motor 18 and causes counter 34 to count up responsive to each new signal from comparator 58. The presence of a reverse motor control signal, e.g., a signal at FMC, causes counter 34 to count down responsive to each new signal from comparator 58.**

The counter 34 is also responsive to a signal on line **34*c* for automatically resetting itself to an initial state. Although not a part of this invention and not shown, circuitry is preferably provided for applying a reset signal on line 34*c* when a cassette 13 is inserted into the machine or it is otherwise desired to reset the counter to an initial state. A reset signal may be applied on line 34*c* when it is desired to reset the counter 34 at other times than when a cassette is inserted. For example, the counter 34** may be reset following a rewind of the tape in the cassette to insure that the counter begins at its initial state. However, the details of the apparatus for this function is not needed for an understanding of the present invention.

The D/A converter 36 is a conventional resistor converter well known in the computer art having resistors R1 through Rx corresponding to the outputs 1 through *x* of the binary counter 34. The resistors R1 through R*x* each have one end connected through the anode to cathode electrodes of a separate diode 54 to the 1 through *x* outputs of the counter 34. The other end of resistors R1 through Rx are connected in common to the output line **36*a* from the D/A converter 36.** The value of resistors R*x* through R1 have a predetermined relationship which causes the impedance between the output **36*a* and ground or 0 volt potential to decrease in a linear function as the counter counts up and the various outputs 1** to *x* are connected to 0 volts potential. To this end, the resistors in the order R*x* through R1 are each double the value of the preceding resistor. Thus, resistor R*x* −1 has twice the value of resistor R*x*. The resistance of resistor R*x* −2 is four times that of resistor R*x*, etc. The diodes 54 are back biased when the corresponding output is high and prevents current flow through the corresponding resistor.

Assuming that **36*a* is connected to a reference potential such as +V4 (shown at one input to amplifier 64), the current signal flowing along line 36*a* would be linear with increasing count of counter 64 as shown in FIG. 3A. However, this linear signal must be modified to a non-linear signal to represent the true stack diameter. To this end, linearity correct circuit 59** is provided.

Figure 2A:
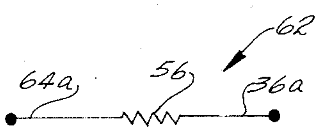
FIGS. 2A, 2B and 2C are circuit diagrams showing alternate linearity correct circuits for use with the digital to analog signal converter shown in FIG. 2.

The linearity correct circuit 59 may take on a number of forms, the end purpose of which is to modify what would otherwise be a linearly changing signal on line **36*a* representing the number of layers of tape on reel 12 to a non-linear signal representing diameter of tape on reel 12. Preferably, the linearity correct circuit 59 includes a non-linearizing circuit 62 which takes the form of a serially connected resistor 56 as shown in FIG. 2A. The resistor 56** is in the order of one-half the value of the lowest valued resistor R*x* of the D/A converter 36. In one preferred embodiment of the present invention, there are seven outputs from the binary counter 34 and hence seven resistors. Thus, *x* is equal to 7. Table I shows the values of the resistors R1 through R7 and resistor 56 for forming a modified signal on line **36*a* directly proportional to increasing stack diameter of tape on reel 12.**

Resistor 56 has one end connected to line **36*a* and the other end connected to the line 64*a* which in turn is connected to one input of operational amplifier 64. Amplifier 64 has a feedback through potentiometer 66 to line 64*a* and hence holds line 64*a* at a positive potential essentially equal to the +V4 potential at its other input. Because of the rather large resistive value of resistor 56, of the same order of magnitude as the smallest of resistors R1 to R7, the current signal out of resistor 56 on line 64*a* is a non-linear curve which is proportional to the diameter of tape on reel 12.**

FIG. 3A is a series of graphs illustrating the signals at various crucial points in the circuit of FIG. 2. As indicated at 2, the linearity correct circuit 62 causes a non-linear signal at **64*a*, the shape of which is inversely proportional to increasing diameter of tape on the reel 12. The operational amplifier 64, with the feedback through potentiometer 66, converts the signal appearing on line 64*a* to produce a voltage signal at 64*b* as shown at 3** in FIG. 3A.

Although the general shape of the curve as shown in plots 2 and 3 of FIG. 3A may represent the increasing diameter of tape on a reel, the curve may be tilted up or down from that required. To tilt the curve of plot 3 to the proper level, potentiometer 66 has its wiper connected to one end of the potentiometer so that is can be adjusted and thereby increase or decrease the resistive feedback between output and input of amplifier 64.

The output **64*b* of the amplifier 64 is connected through a summing resistor 68 to the 70*b* input of a summing amplifier 70 located in a servo control circuit 69. Also in linearity correct circuit 59 is a potentiometer 74 which is connected between a +V3 source of potential and 0 volts potential having a wiper connected to the junction of summing resistor 68 and the summing amplifier 70. Potentiometer 74 is adjusted so that when counter 34 is in its initial state, a proper amount of current is flowing into amplifier 70 to provide the proper initial velocity of the motor 18. Thus the potentiometer 74 provides an initial signal to amplifier 70 which is proportional to the initial diameter of reel 12.**

Consider now servo control circuit 69. The summing amplifier 70 has its output connected through a bias resistor 76 to 0 volts potential and to the base electrode of a transistor 80 having collector and emitter electrodes connected, respectively, between a +V5 source of potential and a resistor 78. The other side of resistor 78 is connected to 0 volts potential. The emitter of transistor 80 is also connected to the base electrode of a transistor 82 whose collector and emitter electrodes, respectively, are connected to the +V5 source of potential and one end of a resistor 84. The armature winding of D.C. motor 18 is connected in series between the +V5 source of potential and ground through the transistor 82, the resistor 84 and a switching transistor 86. The base electrode of transistor 86 is connected through a current limiting resistor 88 to forward motor control FMC.

A circuit 91 senses the counter emf generated in the armature circuit of the motor 18 and provides a signal directly proportional to motor angular velocity. The use of counter emf to provide signals directly proportional to motor angular velocity is well known in the motor art. See, for example, *Electronic Design* 26, published Dec. 19, 1968, pages 100–102. To provide a signal proportional to angular velocity of the motor 18, the servo system of FIG. 2 has a differential amplifier 96 having its two inputs connected through resistors 92 and 94 to the opposite sides of the resistor 84. The output of differential amplifier 96 is connected through a summing resistor 72 to the common input **70*b* of summing amplifier 70.**

The voltage represented by the back emf can be represented by the equation $V_{emf} = V_M - V_{IR}$ where $V_M$ is the total voltage across the armature of the motor 18 and $V_{IR}$ is the voltage generated across the armature of the motor due to the current flow. The operational amplifier 96 floats in potential because of the connection to resistor 94, at approximately the voltage generated across the armature winding of the motor 18. As a result, voltage applied through resistor 94 to differential amplifier 96 is proportional to the total voltage developed across the armature of motor 18. The same current flows through resistor 84 as through the armature of motor 18. Therefore the voltage drop across resistor 84 is directly proportional to $V_{IR}$. The differential amplifier 96 is connected through resistor 92 to the resistor 84 causing the differential amplifier 96 to subtract from the total $V_M$ a signal proportional to the voltage drop across resistor 84, i.e., $V_{IR}$. The resultant current signal formed by differential amplifier 96 is applied through the summing resistor 72 to the input of operational amplifier 70. A feedback resistor 98 is connected between output and input of amplifier 96 to correct the signal going into amplifier 96 from across resistor 84 so that it is in the proper ratio to the voltage $V_M$ developed across the armature winding of motor 18.

In addition to its function of providing a signal proportional to conter *emf,* the feedback circuit, including transistors 80 and 82, resistors 84, 92 and 94, amplifier 96 and resistor 72, provides a feedback loop for amplifier 70 which, due to the high gain of amplifier 70, tends to maintain the voltage at **70*b*** constant.

A coil **50*a* of clutch 50 is connected between the +V5 source of potential and ground through a switching transistor 100. The base of switching transistor 100 is connected through a current limiting resistor 104** to the FMC control signal.

Line 4 of FIG. 3A represents the voltage signal formed on line **96*a* by the differential amplifier 96 as a function of angular velocity of the motor 18. The signal increases with increasing angular velocity. Similarly, the voltage signal on line 64*b* increases with increasing count of the counter 34. The summing resistors 68 nd 72 combine the two signals together to provide a current signal at 70*b* directly proportional to the two signals. The operational amplifier 70 including its feedback loop converts the current signal at 70*b* causing a decrease in current to the armature of motor 18 for increases in voltage signal at either 64*b* or 96*a* produced by increases in diameter of tape or angular velocity of reel 12. Diodes 85 and 102 are provided across the armature of motor 18 and the winding 50*a*** to short out reverse surges of current during switching of current thereto.

Consider now the overall operation of the circuit of FIG. 2. Assume initially that the counter 34 has been reset to its initial or zero state and the tape has been attached to takeup reel 12 but that no tape has been wound thereon. Also assume that a high potential forward motor control signal is formed at FMC. The control signal at FMC switches transistors 86 and 100 into a conductive condition thereby connecting the motor 18 and one end of the winding **50*a* of the clutch 50 to ground. As a result, the clutch 50 connects shaft 20 to gear 72. An initial current flows through transistor 82 and resistor 84 in the armature of the motor 18 causing the motor to rotate at an initial velocity determined by potentiometer 74. The summing amplifier 70 and its feedback loop causes the motor 18 and hence reel 12 to rotate at a substantially constant angular velocity regardless of loading on the reel. Thus, for example, if angular velocity of the motor 18 and reel 12 decrease, the counter emf decreases causing the differential amplifier 96 to decrease its output at 96*a* which in turn causes the summing amplifier 70 to increase its output signal and raise the potential on the base of transistors 80 and 82, increasing current flow through the motor 18 thereby increasing angular velocity of the motor. The binary counter 34 starts counting as the reel 12 rotates and one by one changes the connections of resistors R1 to R7. As a result, the resistance between output 36a and zero volts potential decreases (see plot 1, FIG. 3A). The non-linearizing circuit 62** modifies the signal causing a non-linear signal at line 64a which is inversely proportional to increasing stack diameter. The operational amplifier 64 inverts the signal to form a signal on line 64*b* directly proportional to increasing stack diameter. The signal on line 64*b* and the signal from the back emf generator on line 96*a* are combined by the amplifier 70 through the summing resistors 68 and 72. As the count of counter 34 increases, and hence the diameter of tape on the reel 12 increases, the output signal from summing amplifier 70 decreases, decreasing the bias on the base of resistors 80 and 82 and hence decreasing the amount of current flowing between the +V5 source of potential and ground through the motor 18. As a result, the angular velocity produced by motor 18 and hence the angular velocity of reel 12 decreases.

Thus, a motor control has been disclosed with reference to FIGS. 1 and 2 which provides a control signal for the motor. The control signal has one component caused by the counter, the D/A converter, and the linearity correct circuit which is non-linear with count and varies inversely proportional to the diameter of tape. The signal component causes a substantially constant linear tape velocity. The counter emf circuit causes a signal component in the control signal inversely proportional to angular velocity of motor and reel and hence maintains a substantially constant angular velocity of motor and reel for a given value of the non-linear signals.

One form of the D/A converter 36 and linearity correct circuit 38 has been described with reference to FIGS. 2 and 2A. However, other linearity correct circuits and, in particular, non-linearizing circuits 62 may be devised by those skilled in the art. 362

Figure 2B:
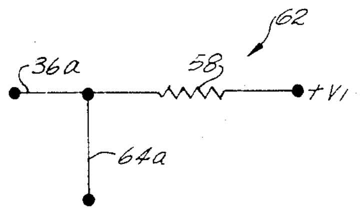

Thus, the non-linearizing circuit of FIG. 2B with the values shown in Table II may also be used. In the circuit of FIG. 2B, the output 36*a* of D/A converter 36 is connected through a resistor 58 to a +V1 source of potential. The input line 64*a* is connected to the junction between line 36a and resistor 58. With the linearity correct circuit of FIG. 2B, it is assumed that the counter 34 has ten outputs and hence *x* is 10. The values of the resistors R1 through R10 and the value of the resistor 58 for this arrangement are shown in Table II.

Again it should be noted that the value of resistor 58 is of the same order of magnitude as the smallest resistor R10 of the D/A converter.

Figure 2C:
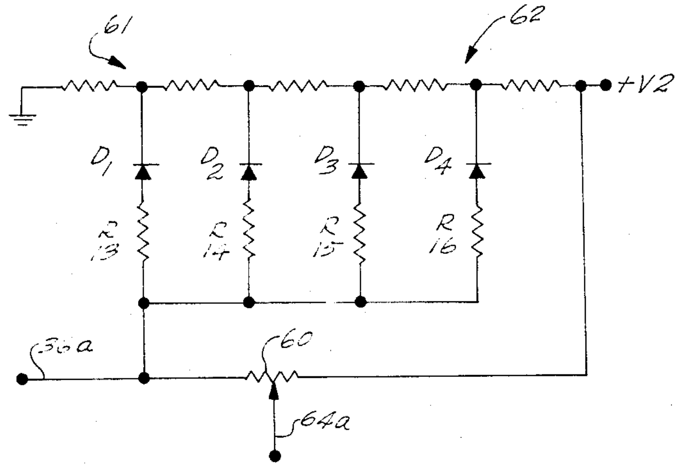

FIG. 2C shows another alternate non-linearizing circuit 62. In this arrangement, the output of D/A converter 36 is connected through a resistor 60 to a +V2 source of potential. The junction between the output 36*a* and the resistor 60 is connected through a resistor ladder network to the same +V2 source of potential. The ladder network includes five resistors 61 serially connected between ground and +V2 source of potential. Resistors R13 through R16 have one end connected in common to the junction between the output 36*a* of the D/A converter and the potentiometer 60 and the respective opposite ends connected through diodes D1 through D4 to separate junctions in between the resistors 61. With the arrangement shown in FIG. 2C and the counter at its initial state, it is assumed that the signal at output 36*a* is initially low at a lower potential than the potential +V2 and as a result, all of the diodes D1 through D4 are reverse biased. It is also assumed that increasing counts of counter 36 increases the voltage at 36*a*. As the voltage level at 36*a* increases, the diodes D1 through D4 switch into conduction at different voltage levels on line 36*a*, depending on the voltage level at the corresponding connection to the series connected resistor 61. The value of the resistors R13 and R16 are selected so that the resultant signal formed on the line 64*a* is essentially a non-linear signal directly proportional to increasing diameter of tape on the reel 12. With the linearity correct circuit of FIG. 2C, it is assumed that the counter 34 has 10 outputs and hence *x* is 10. The values for resistors R1 through R10 and potentiometer 60 are shown in Table III. With the linearity correct circuit of FIG. 2C, preferably the diodes D1, D2, D3 and D4 start conducting when the voltage at 36*a* corresponds to pulse counts of 128, 256, 384 and 512, respectively, by the counter 34. It will be evident that since an increasing signal is formed at 64*a*, it must be inverted before applying the signal to amplifier 64 of FIG. 2 or else appropriate rearrangements of the remaining circuits made to effect a decrease in angular velocity of the motor with an increase in tape diameter.

Figures 4, 5:
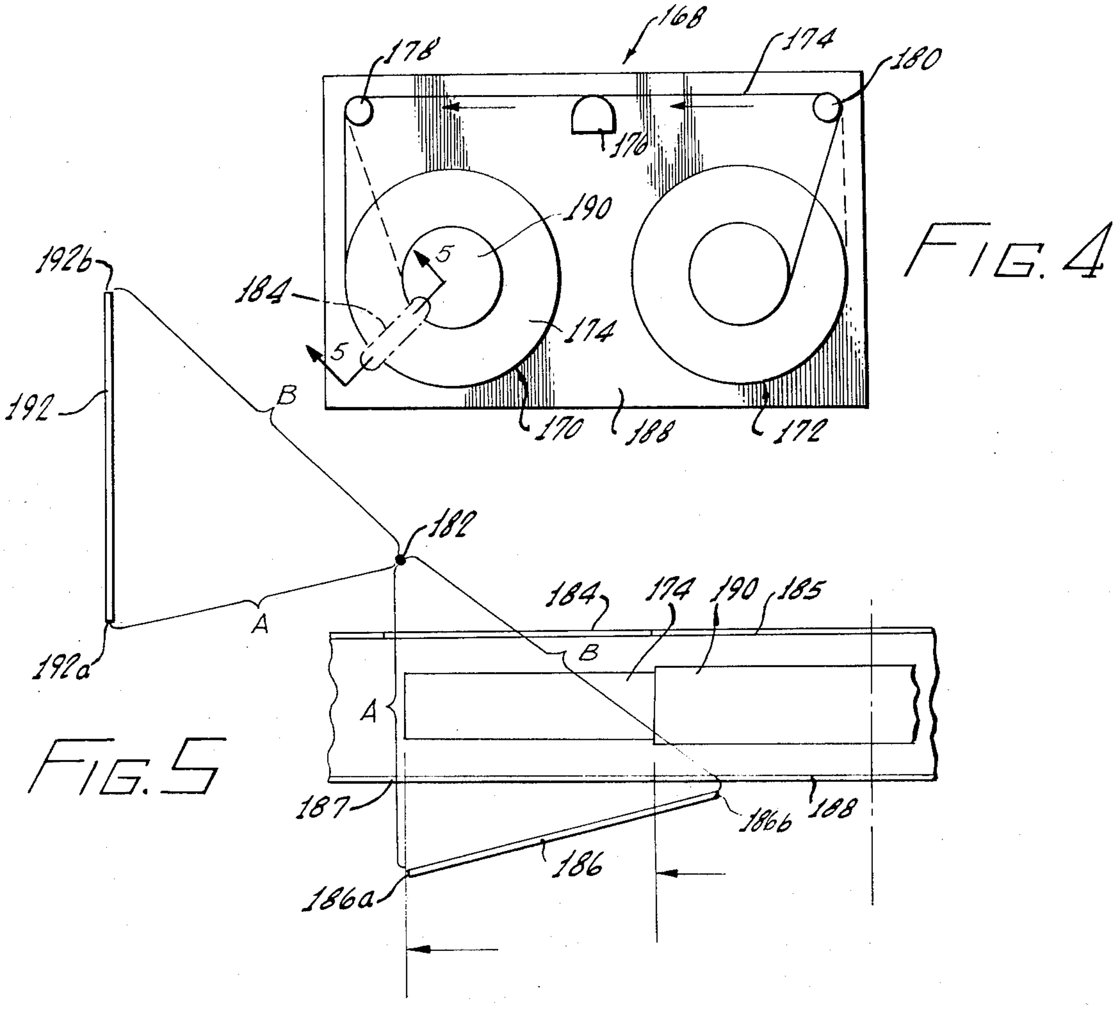
FIGS. 4 and 5 are schematic diagrams representing a plan and side fragmentary view, respectively, of the cassette and optical portion of an alternative embodiment of the present invention utilizing an optical tape diameter sensing system.
Figure 6:
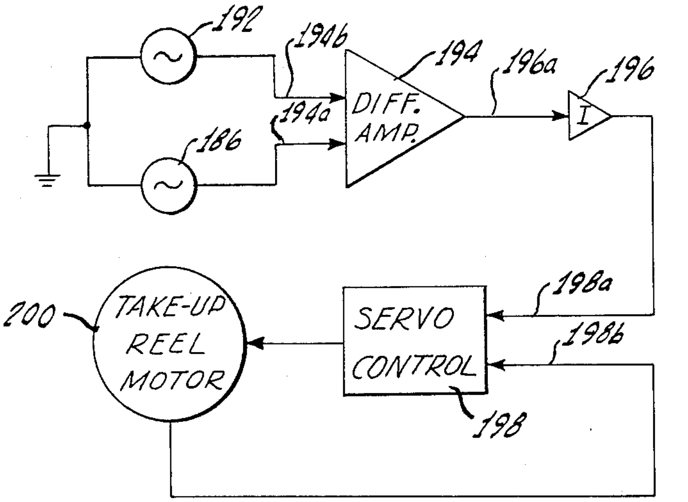
FIG. 6 is a schematic and block diagram representation of the system in which the alternative embodiment of FIGS. 4 and 5 is used.

An alternative method and apparatus for sensing the diameter of tape wound on the take-up reel is shown schematically in FIGS. 4–6. FIG. 4 is a simplified schematic representation of the cassette tape drive with the top and sides of the cassette package removed. In this alternative embodiment of the present invention, a cassette 168 has a take-up reel 170 and a supply reel 172. Magnetic tape 174 is fed between the reels and past an electromagnetic read and write head 176 and guides 178 and 180 are arranged on either side of the head 176 for guiding the tape onto or from the reels. The dotted tape lines in FIG. 4 indicate the position of the tape at the commencement of winding onto take-up reel 170; whereas the solid tape line represents the tape position at the termination of winding onto take-up reel 170.

A light source 182 is positioned in the tape transport above a transparent window 184 defined in the upper surface 185 (shown only in FIG. 5) of cassette 168. A photoelectric strip (photostrip) 186 is positioned below another transparent window 187 aligned with window 184 in a lower surface 188 of the cassette. The two windows are aligned and are identically dimensioned so that the longitudinal extent of each at least spans the distance from a hub 190 of reel 170 to the outer radius of a fully stacked reel. The relationship between light source 182 and photostrip 186 is such that the photostrip can detect increasing amounts of tape wound on takeup reel 170. This is done by the increasing radius of wound tape which cuts off increasing amount of light from light source 182. The photostrip is a conventional light sensitive strip whose resistance changes as the amount of light impinging thereon increases. The photostrip is connected in a voltage divider circuit (not shown) and thereby forms a signal across the photostrip proportional to the amount of light thereon. Thus the signal across photostrip 186 varies proportional to diameter of the tape wound on reel 170.

In order to establish a reference voltage against which the changing voltage output from photostrip 186 may be measured, an additional photoelectric strip (photostrip) 192 is positioned apart from the takeup reel and at a distance such that its right-most end 192*a* is an identical distance "A" from source 182 as is the left-most end 186*a* of photostrip 186. Similarly, the left-most end 192*b* of photostrip 192 is an identical distance "B" from source 182 as is the right-most end 186*b* of photostrip 186. The photostrip 192, similar to photostrip 186, is connected in a voltage divider circuit (not shown) to provide an output signal proportional to the light thereon.

Thus, when no tape is wound on the hub 190 of takeup reel 170, both photostrips sense the exact same amount of light, thereby making their output voltages equal. If all of the tape is wound on hub 190, photostrip 186 detects no light, thereby emitting a 0 volts D.C. output. Photostrip 192, however, continues to sense light along its entire length thereby continuing to emit the maximum voltage output. The difference in voltage from the two photostrips represents the diameter of tape on the reel 170.

As shown in FIG. 6, the voltage outputs from each of photostrips 186 and 192 are applied to different inputs of a differential amplifier 194 along lines 194*a* and 194*b*. Amplifier 194 detects any difference between the signals on lines 194*a* and 194*b* and amplifies such difference. Inverter 196 inverts the signal from amplifier 194 and applies the inverter signal to a servo control 198. The difference signal increases non-linearly because the radius of tape wound on the reel increases non-linearly, i.e., it increases in radius slower as more tape is wound since the circumferential extent of the tape wound on the reel is increasing. Additionally, the shape of photostrips 186 and 192 can be selected to give the required non-linear output signal for motor control. The need for a counter, digital to analog converter, and linearity correct circuit, as in the embodiment of FIGS. 3 and 4, is thereby eliminated.

As with the case of the embodiment of FIG. 1, the signal output from inverter 196 is used as a reference signal along line 198*a* for a servo control circuit 198, which additionally receives a signal along line 198*b* induced by the back emf of a take-up D.C. motor 200 for take-up reel 170. Circuit 198 compares the signals on lines 198*a* and 198*b* and, if a difference is detected, adjusts the speed of motor 200 by varying the D.C. current supplied thereto in accordance with the procedure discussed in FIG. 4, above. Thus, motor control comprising elements 192, 186, 194, 196 and the counter emf, forms a control signal in the armature of motor 200 which has one component inversely proportional to diameter of tape and a second component inversely proportional to angular velocity of reel and motor.

Although the preferred embodiment of the present invention have been described with specific regard to a cassette-type digital data recording system, the invention is not to be so confined, but rather can be used with any magnetic tape recording system where a constant tape rate is desirous.

TABLE I

RESISTOR VALUES FOR CORRECT CIRCUIT OF FIG. 2A

| Resistor | Value in Thousands of Ohms |
|---|---|
| R1 | 121 |
| R2 | 61.9 |
| R3 | 31.6 |
| R4 | 16.2 |
| R5 | 8.25 |
| R6 | 4.22 |
| R7 | 2.15 |
| 56 | 1.78 |

TABLE II

RESISTOR VALUES FOR CORRECT CIRCUIT OF FIG. 2B

| Resistor | Value in Thousands of Ohms |
|---|---|
| R1 | 210 |
| R2 | 105 |
| R3 | 52.3 |
| R4 | 26.1 |
| R5 | 13.0 |
| R6 | 6.49 |
| R7 | 3.24 |
| R8 | 1.62 |
| R9 | 0.806 |
| R10 | 0.402 |
| 58 | 0.283 |

TABLE III

RESISTOR VALUES FOR CORRECT CIRCUIT OF FIG. 2C

| Resistor | Value |
|---|---|
| R1 | 512RI |
| R2 | 356RI |
| R3 | 128RI |
| R4 | 64RI |
| R5 | 32RI |
| R6 | 16RI |
| R7 | 8RI |
| R8 | 4RI |
| R9 | 2RI |
| R10 | RI |
| 60 | Much greater than RI |

We claim:

1. In a magnetic tape transport having a read or write head for tape connected between supply and take-up reels, apparatus for transporting the tape between the reels past the head at a substantially constant linear velocity comprising:

a. controllable means responsive to an applied control signal for driving and thereby rotating a driven one of said reels; and b. control means for applying a non-linear control signal, which is inversely proportional to the diameter of tape on said driven reel to said controllable means and comprising 1. means for providing a series of signals corresponding to the number of revolutions of said driven reel;

2. a counter for counting said series of signals and for providing digital output signals representative of the accumulated count and representative of the number of layers of tape wound on said driven reel;

3. a digital to analog converter for converting said digital signals to an analog signal; and 4. means coupled to said digital to analog converter for forming said control signal and comprising means for modifying said analog signal to a non-linear signal which is inversely proportional to the diameter of tape on said driven reel;

said controllable means being responsive to said non-linear signal for driving said driven reel at an angular velocity which is substantially directly proportional to said non-linear signal and thereby maintain a substantially constant linear velocity of said tape.

2. In a magnetic tape transport according to claim 1 wherein said controllable means comprises:

a. a motor;

b. a drive chain connected to said motor for rotation of the driven wheel; and wherein said means for providing a series of signals comprises:

1. an apertured member rotatably coupled to the driven reel;
2. a light source on one side of the member; and
3. photodetection means on the other side of the member, the member thereby operating to mask the light from the light source to the photodetection means at all times when the aperture is not correctly aligned, and the photodetection means being operative to generate a signal each time the light source, aperture and photodetection means are in alignment.

3. In a magnetic tape transport having a read or write head for tape connected between supply and take-up reels, apparatus for transporting the tape between the reels past the head at a substantially constant linear velocity comprising:

a. controllable means responsive to an applied control signal or driving and thereby rotating a driven one of said reels; and
b. control means for applying a non-linear control signal, which is inversely proportional to the diameter of tape on said driven reel to said controllable means and comprising
   1. a source of light;
   2. first photodetection means for sensing the amount of light impinging thereon, the source of light and first photodetection means bieng positioned on opposite sides of one of such reels of tape, the first photodetection means being partially masked by the reel of tape as tape is wound on such reel thereby providing an output signal corresponding to the diameter of tape wound on such reel;
   3. a second photodetection means responsive to said source of light for establishing a reference signal equal to the maximum possible value of said output signal; and
   4. means for detecting and amplifying any difference between said output signal and said reference signal to form the non-linear signal; said controllable means being responsive to said non-linear signal for driving said driven reel at an angular velocity which is substantially directly proportional to said non-linear signal and thereby maintain a substantially constant linear velocity of said tape.

4. In a magnetic tape transport having a read or write head for tape connected between supply and take-up reels, apparatus for transporting the tape between the reels past the head at a substantially constant linear velocity comprising:

a. controllable means responsive to an applied control signal for driving and thereby rotating one of said reels;
b. control means for applying said control signal to said controllable means and comprising:
   1. means for forming in said control signal a first non-linear signal component which is inversely proportional to the diameter of tape on said driven reel and comprising:
      aa. means for providing a series of signals corresponding to the number of revolutions of said driven reel,
      bb. a counter for counting said series of signals and for providing digital output signals representative of the accumulated count and representative of the number of layers of tape wound on said driven reel,
      cc. a digital to analog converter for converting said digital signal to an analog signal, and
      dd. means coupled to said digital to analog converter for modifying said analog signal and thereby forming in said control signal said non-linear signal component inversely proportional to the diameter of tape on said driven reel, and
   2. means for sensing the angular velocity of said driven reel and means for forming a second signal component in said control signal inversely proportional to said sensed angular velocity.

* * * * *

PO-1050
(5/69)

UNITED STATES PATENT OFFICE
CERTIFICATE OF CORRECTION

Patent No. 3,764,087 Dated Oct. 9, 1973

Inventor(s) Eugene E. Paananen, Ladislao C. Csengery, Richard J. Barry

It is certified that error appears in the above-identified patent and that said Letters Patent are hereby corrected as shown below:

Col. 2, line 52, after "material", insert --being--; Col. 7, line 43, "FMC" should read --FMC--; line 46, "FMC", first occurrence should read --FMC--; line 52, "FMC" should read --FMC--; col. 10, line 12, "conter" should read --counter--; line 28, "nd" should read --and--; Col. 11, line 29, "signals" should read --signal--; line 34 "362" should be deleted; Col. 15, line 18, "or" should read --for--; line 27, "bieng" should read --being--.

Signed and sealed this 23rd day of April 1974.

(SEAL)
Attest:

EDWARD M. FLETCHER, JR.
Attesting Officer

C. MARSHALL DANN
Commissioner of Patents